United States Patent
Cabral et al.

(10) Patent No.: US 7,268,789 B2
(45) Date of Patent: *Sep. 11, 2007

(54) REFLECTION SPACE IMAGE BASED RENDERING AT AN INTERACTIVE FRAME RATE

(75) Inventors: Brian Keith Cabral, San Jose, CA (US); Marc Olano, San Francisco, CA (US); Philip Nemec, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 10/996,751

(22) Filed: Nov. 24, 2004

(65) Prior Publication Data

US 2005/0099418 A1   May 12, 2005

Related U.S. Application Data

(63) Continuation of application No. 10/694,470, filed on Oct. 27, 2003, now Pat. No. 7,123,259, which is a continuation of application No. 09/369,359, filed on Aug. 6, 1999, now Pat. No. 6,697,062.

(51) Int. Cl.
G09G 5/00 (2006.01)

(52) U.S. Cl. .................. 345/582; 345/619; 345/581; 345/629; 345/635

(58) Field of Classification Search ........ 345/418–426, 345/581–583, 644–646, 635
See application file for complete search history.

(56) References Cited

U.S. PATENT DOCUMENTS

| | | | | |
|---|---|---|---|---|
| 5,734,385 | A | * | 3/1998 | Mima .......................... 345/426 |
| 5,877,769 | A | * | 3/1999 | Shinohara .................... 345/419 |
| 6,034,691 | A | * | 3/2000 | Aono et al. ................. 345/582 |
| 6,157,386 | A | * | 12/2000 | Wilde .......................... 345/587 |
| 6,215,496 | B1 | * | 4/2001 | Szeliski et al. ............. 345/419 |

OTHER PUBLICATIONS

Bastos, Rui. "Increased Photorealism for Interactive Architectural Walkthroughs" Apr. 1999, p. 183-190, 235.*

* cited by examiner

*Primary Examiner*—Ulka Chauhan
*Assistant Examiner*—Eric Woods
(74) *Attorney, Agent, or Firm*—Woodcock Washburn LLP

(57) ABSTRACT

The present invention provides a method, system, and computer program product for reflection space image based rendering of an object at an interactive frame rate. A set of source radiance environment maps associated with a set of source viewing vectors are warped to create a destination radiance environment map associated with a destination viewing vector in a current frame. Blending and weighting operations can also be applied in creating the final destination radiance environment map. An object is then rendered with texture environment mapped from the destination radiance environment map.

7 Claims, 10 Drawing Sheets

REFLECTION SPACE IMAGE BASED RENDERING AT AN INTERACTIVE FRAME RATE

CROSS-REFERENCE TO RELATED APPLICATIONS

This application is a continuation U.S. Pat. No. 7,123,259, filed Oct. 27, 2003, which is a continuation of U.S. Pat. No. 6,697,062, filed Aug. 6, 1999, both of which are herein incorporated by reference in their entirety.

BACKGROUND OF THE INVENTION

1. Field of the Invention

The present invention relates to the field of computer graphics.

2. Related Art

Offline rendering algorithms have to a great extent conquered physically accurate photo-realism and complex synthetic shading. A result of over twenty years of research, these techniques all solve the lighting or rendering equation in some manner. See, the techniques in Blinn, J. F. and Newell, M. E., *Comm. ACM* 19:542-546 (1976); Cook, R. L., et al., "The Reyes image rendering architecture," in *Computer Graphics (SIGGRAPH '87 Proc.)*, vol. 21, Stone, M. C., ed., (July 1987), pp. 95-102; Debevec, P., "Rendering synthetic objects into real scenes: Bridging traditional and image-based graphics with global illumination and high dynamic range photography," in *SIGGRAPH 98 Conf Proc.*, Cohen, M., ed., Annual Conference Series, ACM SIGGRAPH, Addison Wesley (July 1998), pp. 189-198; He, X. D., et al, "A comprehensive physical model for light reflection," in *Computer Graphics (SIGGRAPH '91 Proc.)*, vol. 25, Sederberg, T. W., ed. (July 1991), pp. 175-186; Jensen, H. W. and Christensen, P. H., "Efficient simulation of light transport in scenes with participating media using photon maps," in *SIGGRAPH 98 Conf. Proc.*, Cohen, M., ed., Annual Conference Series, ACM SIGGRAPH, Addison Wesley (July 1998), pp. 311-320; Miller, G. S. and Hoffman, C. R., "Illumination and reflection maps: Simulated objects in simulated and real environments, in *SIGGRAPH '84 Advanced Computer Graphics Animation seminar notes* (July 1994); Poulin, P. and Fournier, A., "A model for anisotropic reflection," in *Computer Graphics (SIGGRAPH '90 Proc.)*, vol. 24, Baskett, F., ed., (August 1990), pp. 273-284; Veach, E. and Guibas, L. J., "Metropolis light transport," in *SIGGRAPH 97 Conf Proc.*, Whitter, T., ed., Annual Conference Series, ACM SIGGRAPH, Addison Wesley (August 1997), pp. 65-76, and the rendering equation in Kajiya, J. T., "The rendering equation," *Computer Graphics (SIGGRAPH '86 Proc.)*, vol. 20, Evans, D. C. and Athay, R. J., eds., (August 1986), pp. 143-150.

A trade-off between speed and quality exists in off-line rendering and interactive rendering. The outstanding rendering challenge now becomes how to increase the performance of sophisticated shading algorithms without losing the advancements made in quality. This implies that many orders of magnitude in performance improvements must be found. Traditionally, this has been accomplished by vastly simplifying the approximations used in the shading and lighting equations—resulting in a significant loss in complexity and quality.

Environment mapping is one method used to improve the realism of interactive rendering. As originally described by Newell and Blinn (Blinn, J. F. and Newell, M. E., *Comm. ACM* 19:542-546 (1976)), a simple environment map is used to quickly find reflections of distant objects from a perfectly mirrored surface. Other researchers refined this notion by generalizing the BRDF used, though some of these refinements lost the interactivity of simple environment mapping. See, Cabral, B., et al., "Bidirectional reflection functions from surface bump maps," in *Computer Graphics (SIGGRAPH '87 Proc.)*, vol. 21, Stone, M. C., ed., (July 1987), pp. 273-281; Greene, N., "Applications of world projections," in *Proc. Graphics Interface '86*, Green, M., ed. (May 1986), pp. 108-114; Miller, G. S. and Hoffman, C. R., "Illumination and reflection maps: Simulated objects in simulated and real environments, in *SIGGRAPH '84 Advanced Computer Graphics Animation seminar notes* (July 1994); Poulin, P. and Fournier, A., "A model for anisotropic reflection," in *Computer Graphics (SIGGRAPH '90 Proc.)*, vol. 24, Baskett, F., ed., (August 1990), pp. 273-284.

Another method used to bridge the gap between realism and interactivity is image based rendering (McMillan, L. and Bishop, G., "Plenoptic modeling: An image-based rendering system," in *SIGGRAPH 95 Conf Proc.*, Cook, R., ed., Annual Conference Series, ACM SIGGRAPH, Addison Wesley (August 1995), pp. 39-46). Image based rendering (IBR) avoids solving the lighting equation during interactive rendering by warping existing photographs or images. These images can be thought of as radiance maps (Gershbein, R., et al., "Textures and radiosity: Controlling emission and reflection with texture maps," in *Proc. SIGGRAPH '94* (Orlando, Fla., Jul. 24-29, 1994), Glassner, A., ed., Computer Graphics Proceedings, Annual Conference Series, ACM SIGGRAPH, ACM Press (July 1994), pp. 51-58), and generalized to light fields (Levoy, M. and Hanrahan, P., "Light field rendering," in *SIGGRAPH 96 Conf Proc.*, Rushmeier, H., ed., Annual Conference Series, ACM SIGGRAPH, ACM Press (August, 1996), pp. 31-42) and lumigraphs (Gortler, S. J., et al, "The lumigraph," in *SIGGRAPH 96 Conf Proc.*, Rushmeier, H., ed., Annual Conference Series, ACM SIGGRAPH, ACM Press (August, 1996), pp. 43-54). This works well for predefined scenes or images, but not for dynamically changing synthetic objects.

Recently, Debevec (Debevec, P., "Rendering synthetic objects into real scenes: Bridging traditional and image-based graphics with global illumination and high dynamic range photography," in *SIGGRAPH 98 Conf Proc.*, Cohen, M., ed., Annual Conference Series, ACM SIGGRAPH, Addison Wesley (July 1998), pp. 189-198) combined captured environment maps and synthetic objects to produce compelling renderings with both synthetic objects and image based environments. His techniques do not work at interactive rates since he computes the lighting equation integration as he renders using RADIANCE (Ward, G. J., "The RADIANCE lighting simulation and rendering system," *Proc. SIGGRAPH '94* (Orlando, Fla., Jul. 24-29, 1994), Glassner, A., ed., Computer Graphics Proceedings, Annual Conference Series, ACM SIGGRAPH, ACM Press (July 1994), pp. 459-572).

What is needed is an interactive photo-realistic rendering algorithm or system.

SUMMARY OF THE INVENTION

The present invention provides a method, system, and computer program product for reflection space image based rendering of an object at an interactive frame rate. A set of source radiance environment maps associated with a set of source viewing vectors are warped to create a destination radiance environment map associated with a destination viewing vector in a current frame. Blending and weighting operations can also be applied in creating the final destination radiance environment map. An object is then rendered with texture environment mapping from the destination radiance environment map.

According to one embodiment, at set-up, geometry information for a global set of source viewing vectors and a global set of source radiance environment maps are loaded. A viewpoint tracking loop is then carried out for a current frame. In the viewpoint tracking loop, a destination viewing vector that points along a view direction of the current frame is determined. A subset of source viewing vectors is then determined from the previously loaded global set of source viewing vectors. In one preferred example, the subset of source viewing vectors are a number of viewing vectors (e.g., three source viewing vectors) closest to the destination viewing vector. A set of corresponding weights for the subset of source viewing vectors is also determined.

A warping and blending loop is then performed iteratively on each source radiance environment map corresponding to the subset of source viewing vectors. In one embodiment, each source radiance environment map is warped and blended per texel according to a warping function to a create a destination radiance environment map.

In another preferred embodiment, a fast approximation is made which avoids warping per texel over the entire source radiance environment map. A tessellated mesh with a set of warped texture coordinates is generated. For example, in the case where the source radiance environment maps are sphere maps, the tessellated mesh is simply a tessellated disk. The set of warped texture coordinates at each vertex of the tessellated mesh represent a respective source radiance environment map texel which has been warped according to a warping function evaluated at the destination viewing vector. The mesh is then rendered (also referred to as drawn) using the respective source radiance environment map as a texture map to obtain a texture image. These texture images are also blended with weights corresponding to the respective source viewing vectors. The blended texture images are accumulated in a buffer (such as a frame buffer) to obtain a final destination radiance environment map. Control returns to the viewpoint tracking loop.

The final destination radiance environment map can be further normalized by weight if the weights were not previously normalized. The final destination radiance environment map is then loaded as environment map. An object or scene is then rendered with texture environment mapped from the final destination radiance environment map.

The present invention can be implemented in software, firmware, hardware, or in any combination thereof. The present invention further can be implemented in any graphics architecture or system that supports texture mapping and environment mapping. In one example, not intended to limit the present invention, a routine implementing the present invention is executed on a host processor using a graphics API or library, such as, OpenGL®.

Thus, the present invention goes beyond the work of Debevec by pre-integrating the lighting equation to allow interactive rendering—in part by constraining the geometry of the global radiance environment maps. This introduces a view-dependence in the generated maps, which is overcome with a new form of IBR in reflection space. The result is interactive rendering of synthetic objects using a wide range of surface reflectances (including but not limited to those described by BRDFs) in arbitrary lighting environments.

There are at least two contributions made by the present invention. The first is the application of IBR techniques in reflection space. This is called reflection space IBR—even though the invention does not necessarily operate on normal images, nor is the result a rendered image. Second is our hybrid rendering algorithm. The algorithm of the present invention and the nature of the source radiance environment maps allows new surface reflectances (e.g., BRDFs) and new geometry not found in the original source images to be used—thus extending the class of renderings possible with interactive IBR algorithms.

In sum, the present invention is an intermediate step toward interactive photo-realistic rendering—an algorithm that uses IBR techniques to approximate the integral lighting equation. Such an interactive algorithm is in demand now and will change the nature and work-flow of artists, designers and scientists.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or fictionally similar elements. Additionally, the left-most digit(s) of a reference number identifies the drawing in which the reference number first appears.

DETAILED DESCRIPTION OF THE PREFERRED EMBODIMENTS

Table of Contents

0. Overview and Terminology
1. Routine for Reflection-Spaced Image-Based Imaging
1.1 Set-up 1.2 Viewpoint Tracking Loop
1.3 Warping and Blending Loop
2. Radiance Environment Maps
2.1 Obtaining Radiance Environment Maps
3. Reflection Space IBR
3.1 Sampling View Directions
3.2 Map Warping
3.3 Specific Warps
3.4 Spherical Barycentric Interpolation
4. Rendering Algorithm
5. Examples
6. Example Implementations
7. Example GUI Computer System

8. CONCLUSION

0. Overview and Terminology

High quality, physically accurate rendering at interactive rates has widespread application, but is a daunting task. The present invention bridges the gap between high quality offline and interactive rendering by using existing environment mapping hardware in combination with a new Image Based Rendering (IBR) algorithm. One aspect of the present invention lies in performing IBR in reflection space. The present invention can be applied to ordinary environment maps, but for more physically accurate rendering, reflection space IBR is applied to radiance environment maps. In one example, a radiance environment map pre-integrates a Bidirectional Reflection Distribution Function (BRDF) with a lighting environment. A BRDF can be, but is not limited to, an arbitrary four dimension (4D) function that describes how a physical surface (or non-physical surface) reflects light. Using the reflection-space IBR algorithm on radiance environment maps allows interactive rendering of arbitrary objects with a large class of complex BRDFs in arbitrary lighting environments. The ultimate simplicity of the final algorithm suggests that it will be widely and immediately valuable given the ready availability of hardware-assisted environment mapping.

The term "radiance environment map" is used broadly herein to refer to any type of environment map including viewpoint dependent and viewpoint independent maps. A "radiance environment map" can include but is not limited to, any conventional environment map (both pre-integrated and non-pre-integrated). In one example, a radiance environment map can include but is not limited to one which pre-integrates a Bidirectional Reflection Distribution Function (BRDF) with a lighting environment.

1. Routine for Reflection-Spaced Image-Based Imaging
1.1 Set-Up

Figure 1A:
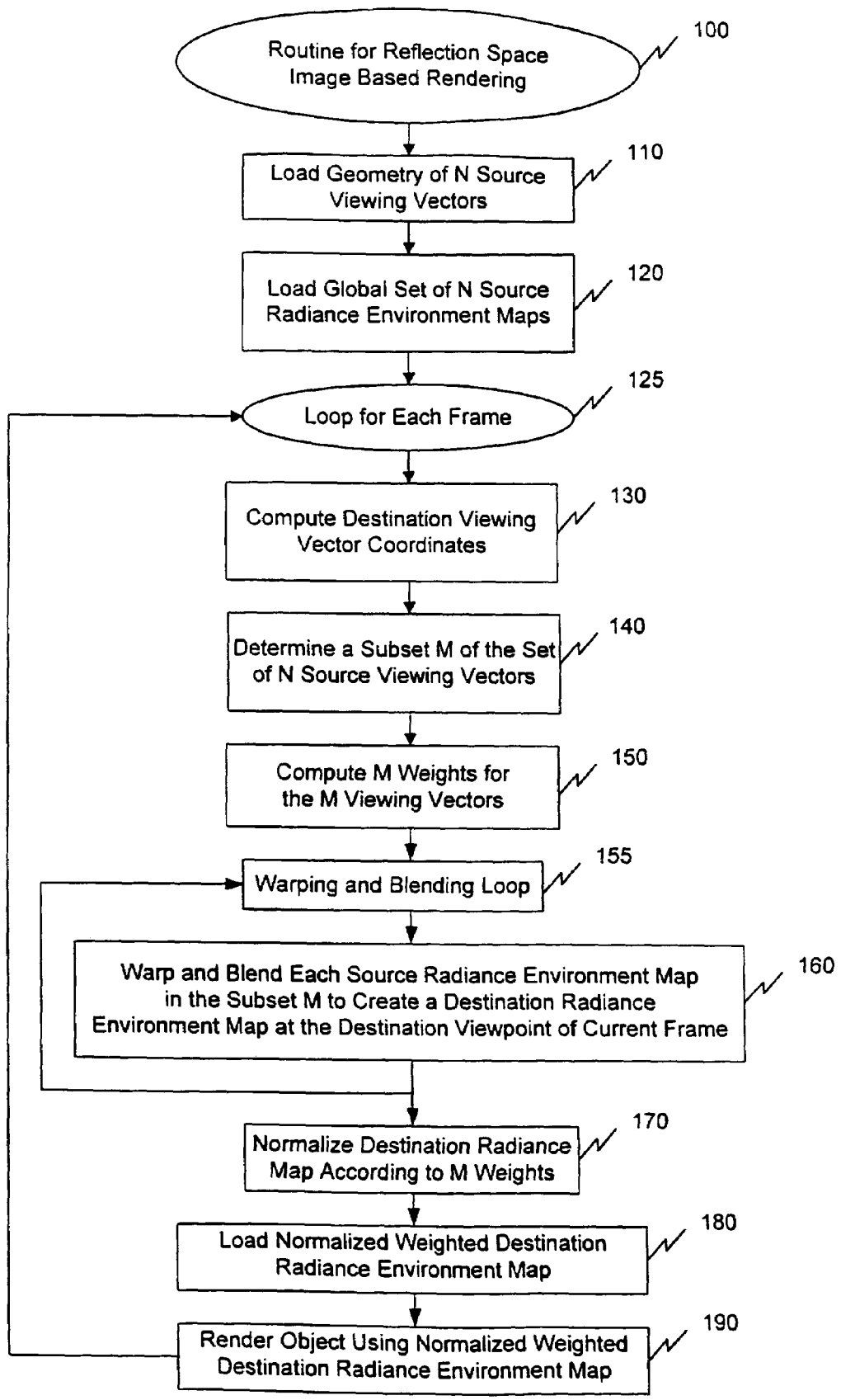
FIGS. 1A and 1B are a flowchart of a routine for reflection space image based rendering according to one embodiment of the present invention.
Figure 1B:
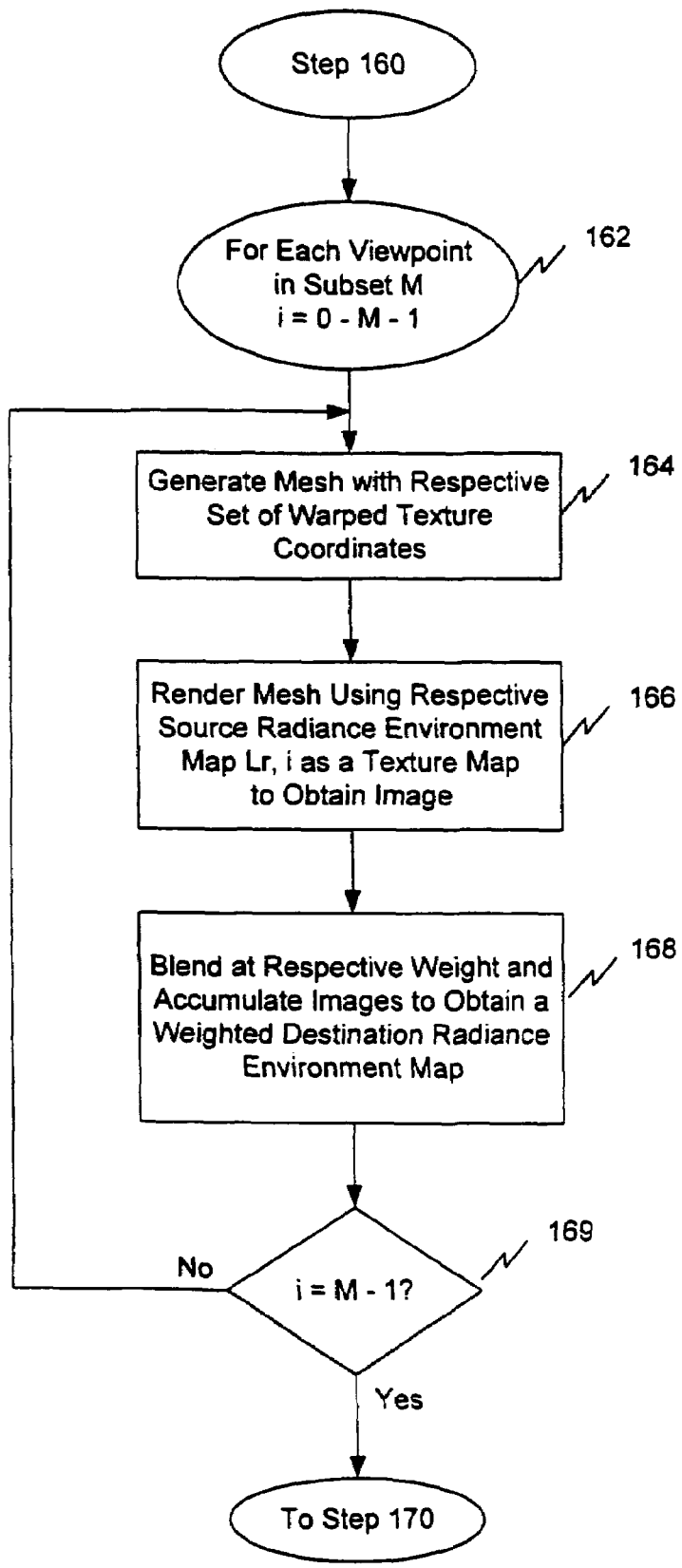

FIGS. 1A and 1B are a flowchart of a routine for reflection-space, image-based rendering (IBR) according to one embodiment of the present invention. Routine 100 includes steps 110 and 120, and a viewpoint tracking loop 125. Steps 110 and 120 are carried out as part of a setup stage. The viewpoint tracking loop 125 is carried out for each frame being rendered at a destination viewpoint. Viewpoint tracking loop 125 includes steps 130 to 190, including a warping and blending loop 155. Warping and blending loop 155 includes a warping and blending operation (step 160) which is carried out for each source radiance environment map in a subset to create a destination radiance environment map at the destination viewpoint of the current frame. FIG. 1B shows the steps involved in the warping and blending loop of step 160 in further detail (steps 162-169) according to one example of the present invention.

At setup, geometry information of source viewing vectors is loaded (step 110). A global set of N source radiance environment maps is also loaded (step 120). Each of these steps is similar to conventional radiance environment mapping except that multiple source viewing vectors and multiple source radiance environment maps are used. For example, in the case of spherical source radiance environment maps are used, spherical geometry information is loaded in step 110. For example, geodesic locations of each of the N source viewing vectors is loaded. Similarly, in step 120, multiple source radiance environment maps representing spherical environment maps taken at different viewpoints are loaded. In general, each of the source radiance environment maps can be taken from any different viewpoint. In one preferred example, twelve source radiance environment maps are used representing twelve approximately equidistant viewpoints in a three-dimensional space around a sphere.

Figure 2:
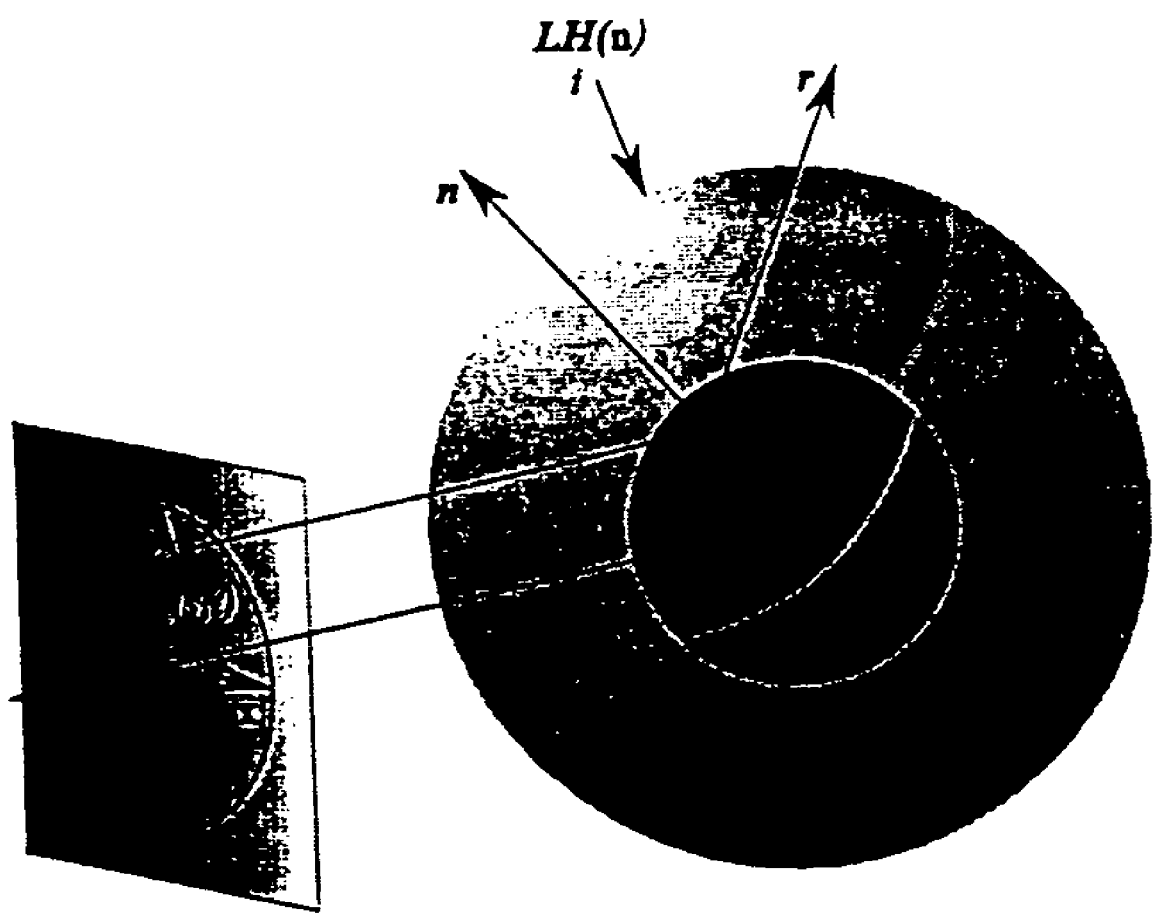
FIG. 2 is a diagram of a radiance environment sphere map.

The present invention can be used with any type of environment map including, but not limited to, radiance environment maps of a spherical or cubic type. In one preferred example, preintegrated radiance environment maps are used of either a spherical or cubic type. An example radiance environment sphere map is shown in FIG. 2. Prior to loading, of course, the multiple source radiance environment maps must be generated off-line. The multiple source radiance environment maps can be generated through photography or computer generated using ray tracing algorithms or other techniques. The generation of the source radiance environment maps is described in further detail below in section 2.

1.2 Viewpoint Tracking Loop

Figure 3:
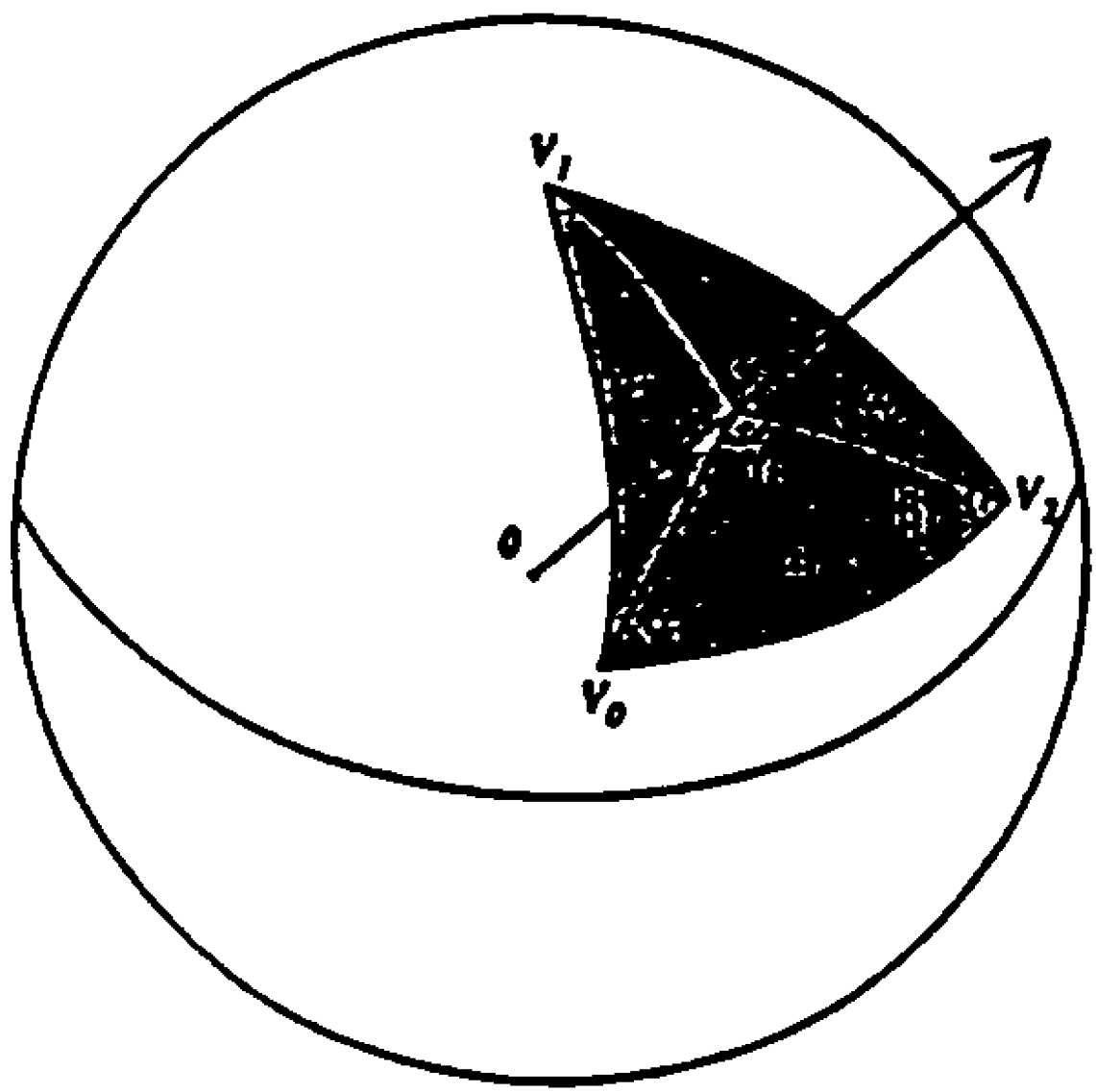
FIG. 3 is a diagram of an example viewing vector v that lies within a spherical patch.

First, destination viewing vector coordinates are computed (step 130). These coordinates define the destination viewing vector of the current frame in three-dimensional space. In general, any three-dimensional coordinate system or coordinate space can be used. An example destination viewing vector $v_d$ in three-dimensional space is illustrated in FIG. 3, as described further below in section 3.4.

Next, a subset of the set of source viewing vectors is determined (step 140). This subset has a number of source viewing vectors M, where M is less than N. In one preferred example, the determination involves finding a number of source viewing vectors (e.g., three) in the set of N source viewing vectors which are nearest to the computed destination viewing vector. In this way, the subset of source viewing vectors corresponds to a subset of the previously-loaded source radiance environment sphere maps which were generated for viewpoints closest to the destination viewpoint of the current frame being rendered.

In step 150, weights are then computed for the subset of viewing vectors determined in step 140. In the case of a sphere geometry example, each of the weights correspond to respective areas of a spherical patch. For example, as illustrated in FIG. 3 and described in further detail in section 3.4 below, if three viewing vectors $v_0$, $v_1$, $v_2$ are determined to be nearest to a particular point of view given by a destination to viewing vector $v_D$, then a spherical patch is defined by the three viewing vectors $v_0$, $v_1$, $v_2$. This spherical patch is a spherical triangle formed by the viewing vectors $v_0$, $v_1$, $v_2$. Destination viewing vector $V_D$ defines the line of sight of the viewer and forms three spherical triangles within the largest spherical patch. As shown in FIG. 3, areas $a_0$, $a_1$, and $a_2$ represent three weights for the sphere maps associated with the viewing vectors $v_0$, $v_1$, and $v_2$, respectively. In this way, the contribution of texture from a source environment map at a source viewing vector can be weighted so that its contribution to a final destination source radiance environment map is proportional to how close the source viewing vector is to the destination viewing vector.

1.3 Warping and Blending Loop

In loop 155, each source radiance environment map corresponding to the subset M of source viewing vectors determined in step 140 is warped and blended to create a destination radiance environment map at the destination viewpoint of the current frame (step 160). In general, each source radiance environment map is warped to create the destination radiance environment map. Blending is used to further improve the quality of the final destination radiance environment map. Blending, of course, could be omitted in certain applications. Also, any type of blending can be used, including, but not limited to the examples of blending described herein.

Specific warping functions for mapping texels from each source radiance environment map to a destination radiance environment map are described in further details in Section 3.2 and 3.3 below. Warping can be expensive if performed per texel over an entire source radiance environment map. Even the case where three source radiance environment maps are warped to create a single, final destination radiance environment map can be expensive and impractical for an interactive application if warping is performed per texel. FIG. 1B shows an example routine that uses a fast, accurate approximation by rendering a final destination radiance environment map as a tessellated mesh. In an example of a destination sphere map, the mesh is a tessellated disk. Texture coordinates at each mesh vertex are then chosen according to a warping function, and the source radiance environment map or image is used as a texture while rendering a tessellated disk into the frame buffer.

An example of this process is shown in the loop 162 in FIG. 1B (steps 164-169). Loop 162 is repeated for each viewpoint $v_i$ in subset M. For example, in the case of three viewing vectors in subset M, loop 162 is repeated three times (i=0 to M−1).

A tessellated mesh is generated with a respective set of warped texture coordinates (step 164). In the case of a sphere map, the tessellated mesh corresponds to a tessellated disk. The set of warped texture coordinates corresponds to the respective source radiance environment map warped according to a warping function. In the present invention, a warping function warps a radiance environment map for one view direction to another view direction. Any warping function can be used depending on a particular application and desired effect.

Two examples of warp functions are further described in Section 3.3 below. One warp function is best used where a central reflection is a surface normal as for diffuse objects. The second warp function is for BRDFs where the central reflection direction generally aligns with the mirror reflection direction as is the case in more shiny objects.

An identity warping function can also be used. An identity warping function is one where essentially no warping only blending occurs. This can be used for example in a case of a mirror warp for a cube map (in other words, in an identity $p_d$ would equal $p_s$ in the warp described below).

Next, the mesh is rendered or drawn (step 166). The respective warp texture coordinates are used to map texture from the respective source radiance environment map to obtain a textured image. Any conventional texture mapping technique can be used including, but not limited to, mip-mapping. The textured image is further blended at a respective weight and accumulated to obtain a weighted destination radiance environment map in a frame buffer or other accumulation buffer (step 168). In step 169, a check is made to determine if i=M−1, that is, whether each source radiance environment map has been warped and blended as described with respect to steps 164-168. Once i=M−1 and all source radiance environment maps in subset M have been warped and blended, then control returns to step 170.

In step 170, the weighted destination radiance environment map is further normalized according to the M weights. Note that step 170 is optional. Step 170 can also be omitted if the weights are first normalized in step 150. The normalized weighted destination radiance environment map is then loaded into memory as an environment map (step 180). An object or scene is then rendered using the normalized destination radiance environment map (step 190). Any conventional environmental mapping technique can be used to map texture from the loaded normalized weighted destination environment map to the object during rendering in step 190 as would be apparent to a person skilled in the art given this description.

After step 190, viewpoint tracking loop 125 repeats for each frame at interactive rates. Interactive rates of approximately 10 frames per second and higher are achieved. In one example, on a Silicon Graphics® Onyx2™ InfiniteReality2™, the interactive viewing program ran at a sustained frame rate of 20 Hz. Such rates are not intended to limit the present invention, however, and in general, faster and slower interactive rates are possible depending on a particular application and hardware support that is provided. Routine 100 is further described with respect to example radiance environment maps and specific warps in Sections 2 through 3 below. An example of routine 100 written in pseudo-code is presented in section 4. Examples of routine 100 applied to rendering an automobile in an environment are further shown below in Section 5. Examples implementations of routine 100 and software, firmware and/or hardware and different types of graphics architectures are also described in Section 6 below.

2. Radiance Environment Maps

A traditional environment map records the incident radiance, $L_i$, from each direction. The two most common representations are the sphere map and the cube map. A sphere map is a view-dependent representation, equivalent to an orthographic view of a reflective sphere. Note that it is not necessary to render an orthographic view when using a sphere map, for example the sphere mapping in OpenGL® 1.2 includes the appropriate correction for perspective views. A cube map is a view-independent representation, created by projecting the environment onto the faces of a cube. These examples are illustrative and not intended to limit the present invention. Other representations of an environment in a reflection space are also possible as would be apparent to a person skilled in the art given this description. For example, a parabolic map can be used. See View-independent environment maps; Wolfgang Heidrich, and Hans-Peter Seidel; Proceedings of the 1998 EUROGRAPHICS/SIGGRAPH workshop on Graphics hardware, 1998, Page 39.

Instead of recording incoming radiance, a radiance environment map records the total reflected radiance, $L_r$, for each possible surface orientation. It is defined by the classic lighting equation (Immel, D. S., et al., "A radiosity method for non-diffuse environments," *Computer Graphics (SIG*

GRAPH '86 Proc.), vol. 20, Evans, D. C. and Athay, R. J., eds., (August, 1986), pp. 133-142):

$$L_r(\theta_r, \phi_r) = \int_H f_r(\theta_i, \phi_i; \theta_r, \phi_r) L_i(\theta_i, \phi_i) \cos\theta_i d\omega_i$$

Thus, $L_r$, is the environment ($L_i$) modulated by the BRDF ($f_r$). H is the hemisphere above the surface, which varies with surface orientation (see FIG. 2). Each texel in a radiance environment map captures the pre-integrated value for $L_r$ for one possible orientation of H. Since the radiance environment map is indexed by orientation, we can choose any of the storage representations used for traditional environment mapping.

FIG. 2 shows an example sphere map representation. FIG. 2 is a diagram of a radiance environment sphere map. A radiance environment sphere map, $L_{r,s}$, is defined on the image plane shown on the left. Each point (s, t) in $L_{r,s}$ is associated with a normal, n, and a reflection vector, r. The normal specifies the hemisphere, H(n) over which $L_i^{H(n)}$ is defined.

The pre-integrated radiance environment map introduces a couple of restrictions for rendering. Since all surface points that have a common normal use the same reflected radiance, only the lighting contribution from a distant environment can be captured, not reflection of local objects or inter-reflection of a single surface. Also, in one preferred example isotopic BRDFs are used (with only a single reflected radiance stored in the map per surface normal it is difficult to record BRDF variation with rotation around the normal).

An approximation is also introduced in the true lighting equation. A radiation environment map is computed with a single view direction, so it is technically incorrect to use it with a perspective view, where the view direction changes from pixel to pixel. While graphics hardware corrects for perspective-induced changes in mirror reflection direction, the correction is not always appropriate for the radiance environment map. Regardless, in the present invention perspective views can be rendered anyway. The usually minor resulting errors, if any, are easily accepted as part of the price for interactivity.

2.1 Obtaining Radiance Environment Maps

Prior to step 110, a set of radiance environments must first be obtained or generated. In one preferred example, pre-integrated radiance environment maps are first obtained or generated in a pre-processing stage. In general, any conventional method for obtaining a set of radiance environment maps for different viewpoints can be used.

One method to obtain radiance environment maps is to take photographs in the desired environment of a physical sphere whose surface BRDF matches that of the target object. The photographs should be taken with a narrow field view lens to approximate an orthographic projection and to minimize the reflection of the camera. The resulting images are the radiance environment maps, with the integration done by nature. The algorithm of the present invention uses several radiance environment maps, so the inventors use several such images along with the camera orientation for each.

Figure 4:
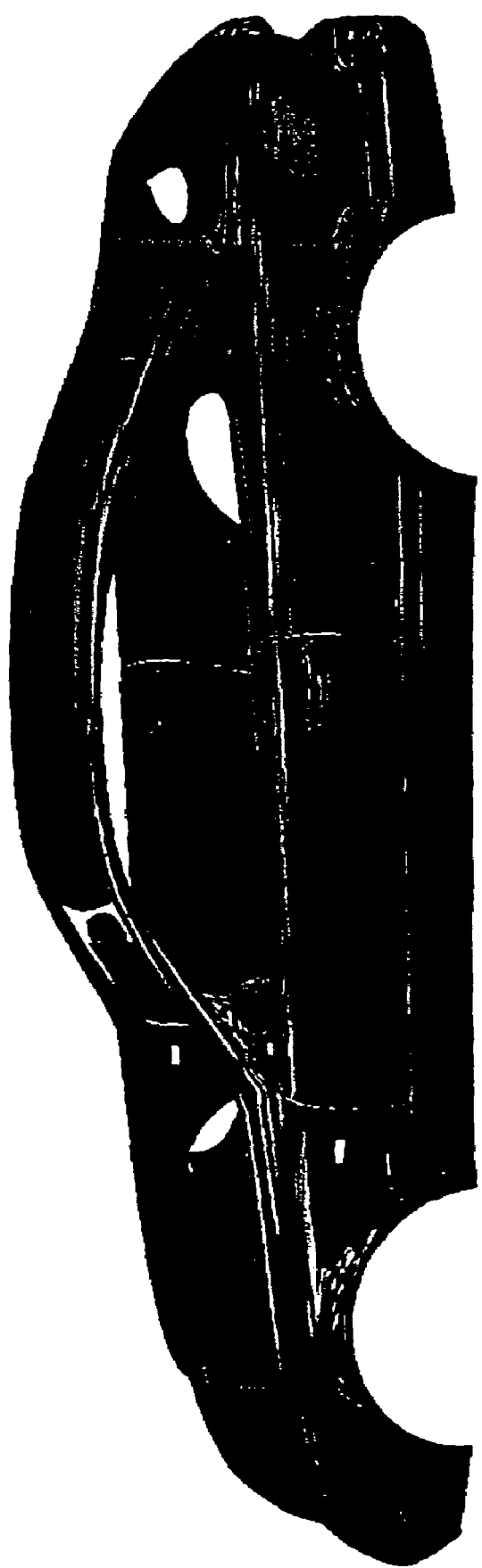
FIG. 4 shows an image of an automobile in an environment generated according to one automobile example of the present invention.

A second method is to compute lighting integral numerically given a desired BRDF and lighting environment. The lighting environment should be known with high dynamic range for good integration results. Such environments can be captured through photographs by the methods of Debevec (Debevec, P. E. and Malik, J., "Recovering high dynamic range radiance maps from photographs," in *SIGGRAPH 97 Conf. Proc.*, Cohen, M., ed., Annual Conference Series, ACM SIGGRAPH, Addison Wesley (August 1997), pp. 369-378), or rendered with a package like RADIANCE (Ward, G. J., "The RADIANCE lighting simulation and rendering system," *Proc. SIGGRAPH '94* (Orlando, Fla., Jul. 24-29, 1994), Glassner, A., ed., Computer Graphics Proceedings, Annual Conference Series, ACM SIGGRAPH, ACM Press (July 1994), pp. 459-572). Six photographs or images have been used to represent $L_i$, arranged as a cube environment map in the present invention. See also Voorhies, D. and Foran, J., "Reflection vector shading hardware," *Proc. SIGGRAPH '94* (Orlando, Fla., July 24-29,1994), Glassner, A., ed., Computer Graphics Proceedings, Annual Conference Series, ACM SIGGRAPH, ACM Press (July 1994), pp. 163-166. Since the BRDF and the environment map, $L_i$, are decoupled, the lighting environment can be reused to compute $L_r$ for many different surface types. Results using maps computed in this way are shown in FIG. 4.

3. Reflection Space IBR

With conventional IBR, the light field is sampled by a discrete set of images. For the present invention's algorithm, these samples are a set of radiance environment maps taken from different viewpoints. These maps must be warped to match a new point of view, then blended together.

In addition to matching the viewpoint, the warping correlates features on the different maps. For traditional IBR, the image correlation may require only an affine or projective warp (Seltz, S. M. and Dyer, C. R., "View morphine: Synthesizing 3D metamorphoses using image transforms," in *SIGGRAPH 96 Conf. Proc.*, Rushmeier, H., ed., Annual Conference Series, ACM SIGGRAPH, Addison Wesley (August 1996), pp. 21-30). For general light fields, it can require gathering light rays in a variety of discontinuous patterns (Levoy, M. and Hanrahan, P., "Light field rendering," in *SIGGRAPH 96 Conf. Proc.*, Rushmeier, H., ed., Annual Conference Series, ACM SIGGRAPH, ACM Press (August 1996), pp. 31-42).

Since each point in a radiance environment map is an integration of the environment and BRDF, the warp that best correlates features in the environment can vary from BRDF to BRDF. By choosing a warp that models the BRDF well, one can significantly reduce the number of radiance environment maps required for good reconstruction. If the BRDF is a perfect mirror and the warp models it as a perfect mirror, one need only sample well enough to catch the highest frequencies in the environment. If the warp does not match the BRDF, one must sample well enough for the product of the highest frequencies in the BRDF and environment. This is because the lighting integral is essentially a convolution of the BRDF with the environment.

According to a further feature, for BRDFs that are principally reflective, a warp is used that matches the reflection directions of the different maps. So a point on the source image warps to the point on the destination image that reflects in the same direction. Primarily diffuse BRDFs suggest a warp that matches surface normal directions. One can find a well-matched warp for any BRDF that is radially symmetric about a principal direction and does not change shape across the surface. With such a BRDF, the same area of the environment will be integrated for corresponding points from different views.

Lambertian diffuse reflection and Phong specular reflection both satisfy this restriction, but most more realistic BRDFs do not. Fortunately, since the radiance environment maps sample a smooth, continuous function, the present invention can effectively handle a much wider class of BRDFs that are close to the symmetric ideal without requiring a large number of sample maps. For example, the inventors have used a numerically computed BRDF with Fresnel effects and diffuse, specular and backscatter components. For the BRDF, the inventors use a warp that matches mirror reflections. It works because the specular lobe is the only high-frequency component of the BRDF and its shape does not vary too much from texel to texel. The Fresnel effects are naturally handled by the method, and the other components do not require a large number of sample maps because they are low frequency.

Once the sample maps have been warped to the new viewpoint, they must be combined with some reconstruction filter. Oppenheim and Schafer (Oppenheim, A. V. and Schafer, R. W., *Digital Signal Processing*, Prentice-Hall, Englewood Cliffs, N.J. (1975)) describe many sampling and reconstruction choices. For simplicity and efficiency, linear interpolation is used between neighboring images. The linear interpolation uses a spherical form of barycentric weights, presented in section 3.4. Thus, for any given viewpoint, the three nearby radiance environment maps are warped and blended to create an approximation to the new map (see FIG. 5).

3.1 Sampling View Directions

Certain environment map representations (e.g., cube maps) are viewpoint independent, while others (e.g., sphere maps) depend on the viewpoint. In contrast, each radiance environment map, whether it is stored in cube map, sphere map or another form, is correct for only a single viewpoint. This is because the radiance environment map captures Fresnel reflection and other view-dependent effects.

As alluded to above, the view-dependence does not limit the use of each map to only one view. This limitation is overcome by precomputing a set of maps—denoted $L_{rj}$, $j \in \{0 \ldots N-1\}$—at various viewpoints. The unit view vectors can be thought of as points lying on a sphere. The inventors use reflection-space IBR to reconstruct the map for rendering from the $L_{rj}$ maps, but in one example, still require reasonable coverage of the sphere of possible view directions to avoid aliasing artifacts. In one case, the inventors have used one $L_r$ for each viewpoint defined at the vertices of an icosahedron. The number of samples has been sufficient for the environments and BRDF which have been employed and is desirable because its symmetry means that each viewpoints is handled in an unbiased manner.

3.2 Map Warping

Each warp is between a source map $L_{r:s}$ (from the precomputed set $L_{rj}$) and a destination map, $L_{r:d}$ (for the current rendering viewpoint). Points in these maps will be called $p_s$ and $p_d$ respectively.

For each map point, p, there is a vector r along the central reflection direction of the BRDF. For Phong specular or perfect mirror reflections, r is the geometric reflection vector. For diffuse surfaces, r is the surface normal. To assist in the warp, define an invertible function $$g: p \to r$$

g(p) depends on both the BRDF and the map representation. It is most easily defined in terms of a local coordinate system for each map, so the inventors also define a transformation per map to convert the local coordinate system to a common global space $$T: r \to \bar{r}$$

The composition of these functions defines the full warp from $p_s$ to $p_d$:

$$p_d = g_d^{-1} \cdot T_d^{-1} \cdot T_s \cdot g_s(p_s)$$

This takes a point in $L_{r:s}$ (defined by s and t texture coordinates for a sphere map representation). It is converted first to a 3D reflection vector in the local coordinate system associated with $L_{r:s}$. This 3D vector is transformed to the global space, then to a vector in the local coordinate system associated with $L_{r:d}$. Finally, the resulting vector is converted to a point in $L_{r:d}$ (once again given by two texture coordinates if one uses the sphere map representation).

3.3 Specific Warps

Two specific warp functions are derived. For clarity, only two warping functions are described in detail. However, other warping functions can be used as would be apparent to a person skilled in the art given this description. Both use a sphere-map representation for $L_{r:s}$ and $L_{r:d}$. The first is for BRDFs where the central reflection direction is the surface normal. The second is for BRDFs where the central reflection direction aligns with the mirror reflection direction.

For both warps, the local coordinate system associated with each map is aligned with the camera used to create the map. The x-axis points right, the y-axis points up and the z-axis points from the origin toward the camera. Thus transformations $T_s$ and $T_d$ are defined as 3×3 matrices with columns equal to three axes expressed in global coordinates.

$$g_{normal}(s, t) = \begin{pmatrix} 2s - 1 \\ 2t - 1 \\ \sqrt{1 - (2s-1)^2 + (t2-1)^2} \end{pmatrix}$$

$$g_{normal}^{-1}(x, y, z) = \left( \frac{x}{2} + 0.5, \frac{y}{2} + 0.5 \right)$$

We base the mirror reflection warp, $g_{mirror}$, on the x, y and z produced by $g_{normal}$:

$$g_{mirror}(s, t) = \begin{pmatrix} 2xz \\ 2yz \\ 2z^2 - 1 \end{pmatrix}$$

$$g_{mirror}^{-1}(x, y, z) = g_{normal}^{-1}\left( \frac{(x, y, z+1)}{\sqrt{x^2 + y^2 + (z+1)^2}} \right)$$

In one example, since graphics hardware is available to do mirror reflections with a sphere map, the final stage of both warps is modified to use $g_{mirror}^{-1}$. The following functional composition chains define the two warps:

$$p^d = g_{mirror}^{-1} \circ T_d^{-1} \circ T_s \circ g_{normal}(p_s)$$

$$p^d = g_{mirror}^{-1} \circ T_d^{-1} \circ T_s \circ g_{mirror}(p_s)$$

Performing three of these warps per texel in the target map for every rendered frame is expensive and impractical for an interactive application. A fast, accurate approximation is possible by rendering the destination sphere map as a tessellated disk. Texture coordinates at each mesh vertex are chosen according to the warping function, and the source image is used as a texture while rendering the disk into the frame buffer. To account for the non-linearity of the warp functions, the mesh is finer toward the edges of the disk and coarser near the center. The 3D coordinate system associated with the destination map changes as the view moves, but the same disk tessellation can always be used. The reflection vectors, $r_d$, also remain constant for each mesh vertex and can be precomputed.

The piecewise linear approximation to the warp is accurate for most of the sphere map area In a sphere map representation, the mirror warp has a singularity at the limit of extreme grazing reflections around the edge of the map—the reflection direction exactly opposite the view vector. The warp equation from $L_{r,s}$ to $L_{r,d}$ can fail at this singularity.

One can locate $p_d$ for the singularity by warping the problem reflection direction (the negated source map view vector) into the destination map. Near this point in the destination map, the source map will become pinched and unreliable instead of warping cleanly. Thus, the inventors use a simple distance from $p_d$ in the destination map to weight our confidence in the warped source image. This weight is used to fade the contribution of each source near its respective singularity.

The textured disk method accelerates the warping operation in two ways. First, s and t are not explicitly calculated for all the points on the sphere map, only at the vertices of the mesh. Second, a major bottleneck in performing the warp is accessing memory associated with the source and destination maps. The inventors leverage the rendering and texturing hardware to solve this memory bottleneck.

3.4 Spherical Barycentric Interpolation

Once the warps have taken place the warped images must be blended. One example interpolation scheme according to the present invention is a spherical variant of classic affine barycentric interpolation, as defined in Farin (Farin, G., *Curves and Surfaces for Computer Aided Geometric Design*, Academic Press, (1990)). Classic barycentric interpolation uses the ratio of the areas of triangles. The inventors instead use the ratio of spherical triangles.

FIG. 3 is a diagram of an example viewing vector v that lies within a spherical patch. Illustrated is the spherical patch defined by source viewing vectors $v_0$, $v_1$ and $v_2$ associated with a particular point of the view given by destination viewing vector $v_d$. By definition, $v_d$ defines in the line at sight of the viewer and in general forms three spherical triangles within the larger spherical triangle patch. Areas $a_0$, $a_1$ and $a_2$ represent the three weights for the sphere maps associated with vertices $v_0$, $v_1$ and $v_2$ respectively, where $\alpha_1$, $\beta_1$ and $\gamma_1$ are the dihedral angles used to compute $\alpha_1$.

Any given view vector, $v_d$, will in general lie within a spherical patch as illustrated in FIG. 3. Each vertex, $v_i$, of this spherical triangle is the view vector for one of the source images that have been warped to match $v_j$, $v_d$ is used to form three interior spherical triangles. The weight for the source image at vertex i is a ratio of the areas of the spherical triangle opposite $v_i$ and the overall spherical triangle. The area of an interior spherical triangle, $\alpha_i$, on a unit sphere is given by the spherical excess formula (Bronshtein, I. and Semendyayev, K., *Handbook of Mathematics*, Van Nostrand Reinhold Company, (1985)):

$$\alpha_i = \alpha_i + \beta_i + \gamma_i - \pi; i \in 0,1,2$$

The dihedral angles $\alpha_i$, $\beta_i$, and $\gamma_i$ are defined as:

$$\alpha_i = \cos^{-1}((v_d v_{(i-1)\otimes 3}) \cdot (v_{(i+1)\otimes 3} v_{(i-1)\otimes 3}))$$

$$\beta_i = \cos^{-1}((v_{(i+1)\otimes 3} v_d) \cdot (v_{(i+1)\otimes 3} v_{(i-1)\otimes 3}))$$

$$\gamma_i = \cos^{-1}((v_{(i+1)\otimes 3} v_d) \cdot (v_{(i-1)\otimes 3} v_d))$$

Where is the normalized cross product and ø is an index wrapping operator, defined as $$a \oslash b = \begin{cases} b-1 & \text{if } a < 0 \\ 0 & \text{if } a \geq b \\ a & \text{otherwise} \end{cases}$$

4. Rendering Algorithm

The present invention leads to a straightforward interactive rendering algorithm. Pseudo-code for the algorithm is given here. It leverages texture mapping graphics hardware in two ways: once to perform the warping and blending between the sample images; and again using the generated sphere map in the final rendering.

```
main ( )
    // Set up radiance maps and sphere geometry
    G_v - LoadGeodesicLocations( ); v ∈ {(θ_0, φ_0) . . . (θ_{N-1}, φ_{N-1})}
    Lr,j - LoadSphereMaps (G, L_p f_r);j ∈ {0 . . . N - 1}
    //Viewpoint tracking loop
    loop for each frame
        (x_d, y_d, v_d) - ComputeViewCoordinateSystem( )
        (v_0, v_1, v_2) - FindSubtendedTriangle(G, v_d)
        (a_0, a_1, a_2) - ComputeWeights( (v_0, v_1, v_2), v_d)
        glClearAccum( 0, 0, 0, 0)
        //Warp and blending loop
        loop for each of the three vertices, i
            mesh - ComputeMesh(v_i, v_d)
            DrawMesh(mesh, L_{r,i})
            glAccum(GL_ACCUM, a_i)
        end vertex loop
        glAccum(GL_RETURN, 1.0/(a0 + a1 + a2))
        LoadNewSphereMap( )
        RenderObject ( )
    end frame loop
```

The interactive rendering program outlined above reads in a set of sphere maps at a prescribed set of geodesic locations along with the associated triangle faces. This decouples the interactive program from any specific choice of sphere map sampling view directions.

5. Examples

Figure 5:
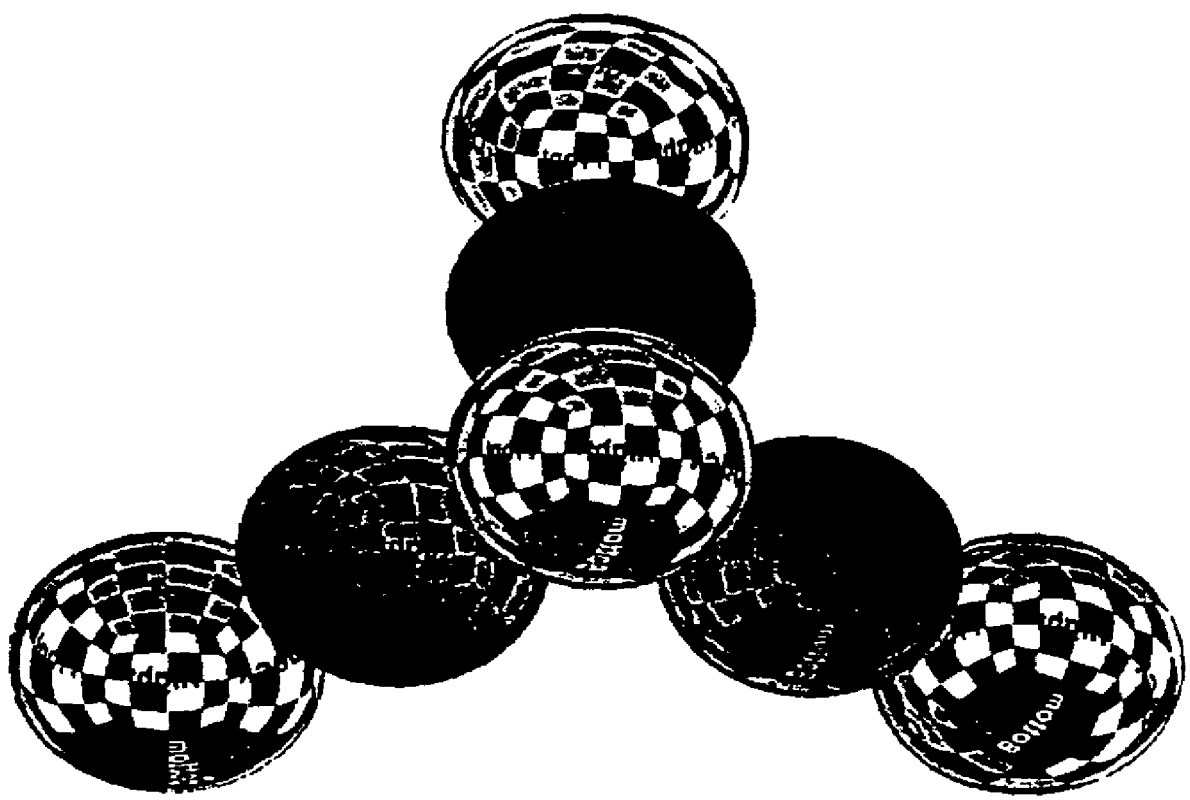
FIG. 5 shows example images of source radiance environment maps, corresponding destination radiance environment maps after warping and blending with appropriate spherical barycentric weighting, and a final generated radiance environment map according to an example of the present invention.
Figure 6:
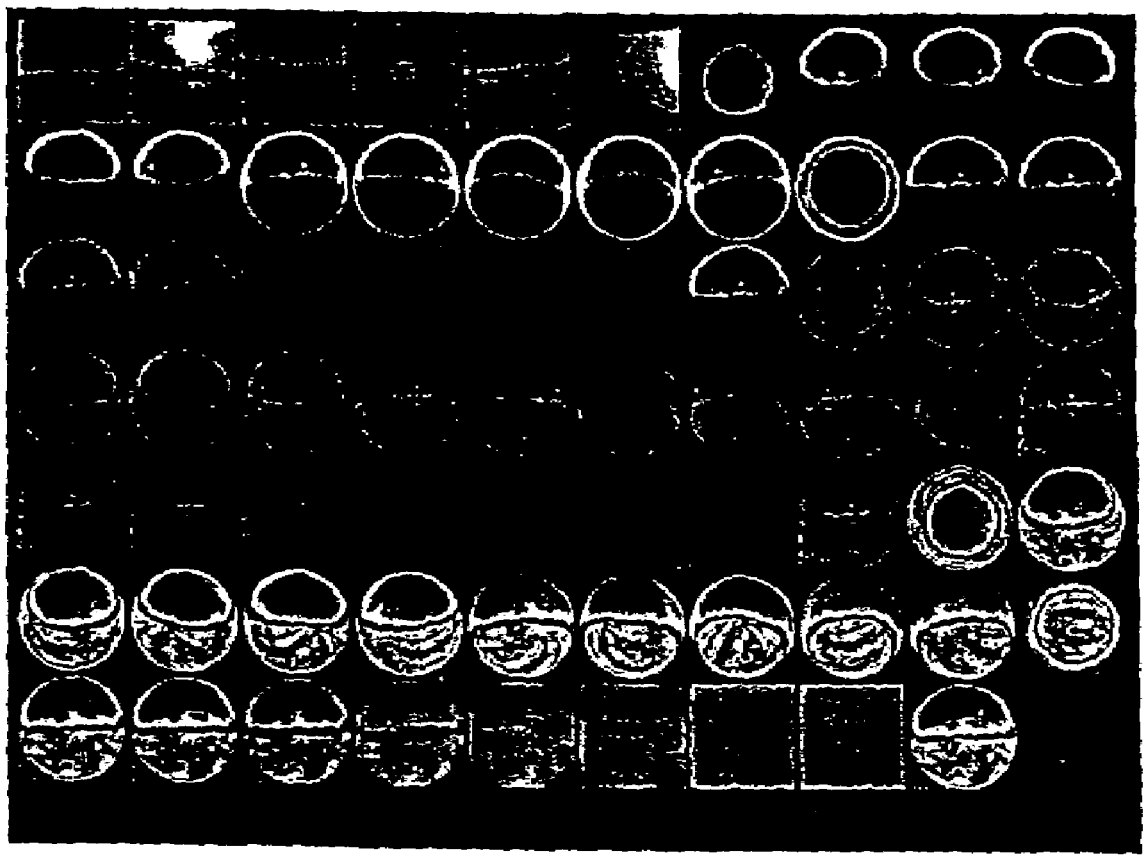
FIG. 6 shows all of the textures used to render an example image of a full model car.

The inventors have validated this technique with several examples. FIG. 4 shows an image of an automobile in an environment generated according to one automobile example of the present invention. FIG. 5 shows example images of source radiance environment maps, corresponding destination radiance environment maps after warping and blending with appropriate spherical barycentric weighting, and a final generated radiance environment map according to an example of the present invention. The outer images are source radiance environment maps for a test environment and a mirror BRDF. The next layer of images show each map warped to the new viewpoint with appropriate spherical barycentric weighting. The center image is the final generated radiance environment map. FIG. 6 shows all of the textures that would be used to render a full model of a car, with separate radiance environment maps generated for the paint, chrome trim, and windows.

FIG. 4 shows an automobile rendered according to the present invention. The car shows an isotropic BRDF modeling automobile paint, computed using techniques similar to that found in Gondek (Gondek, J. S., et al., "Wavelength dependent reflectance functions," in *Proc. SIGGRAPH '94* (Orlando, Fla., Jul. 24-29, 1994), Glassner, A., ed., Computer Graphics Proceedings, Annual Conference Series, ACM SIGGRAPH, ACM Press (July 1994), pp. 213-220). In one example, the inventors modeled the clear polyurethane coat over a paint substrate containing paint particles. An offline ray tracer customized to model the car's paint and polyurethane surfaces was used to directly solve the lighting integral for each point in twelve pre-computed radiance environment maps. Thus the under coat of the paint and the clear coat are both modeled with high fidelity. Each sphere map took several minutes to create.

Each of the articles and references cited herein are incorporated in their entirety herein by reference.

6. Example Implementations

Routine 100 as described above can be implemented in software, firmware, hardware, or in any combination thereof. Several example environments that can support an implementation of routine 100 are further described with respect to FIGS. 7 to 9. These examples are illustrative and not intended to limit the present invention.

Figure 7:
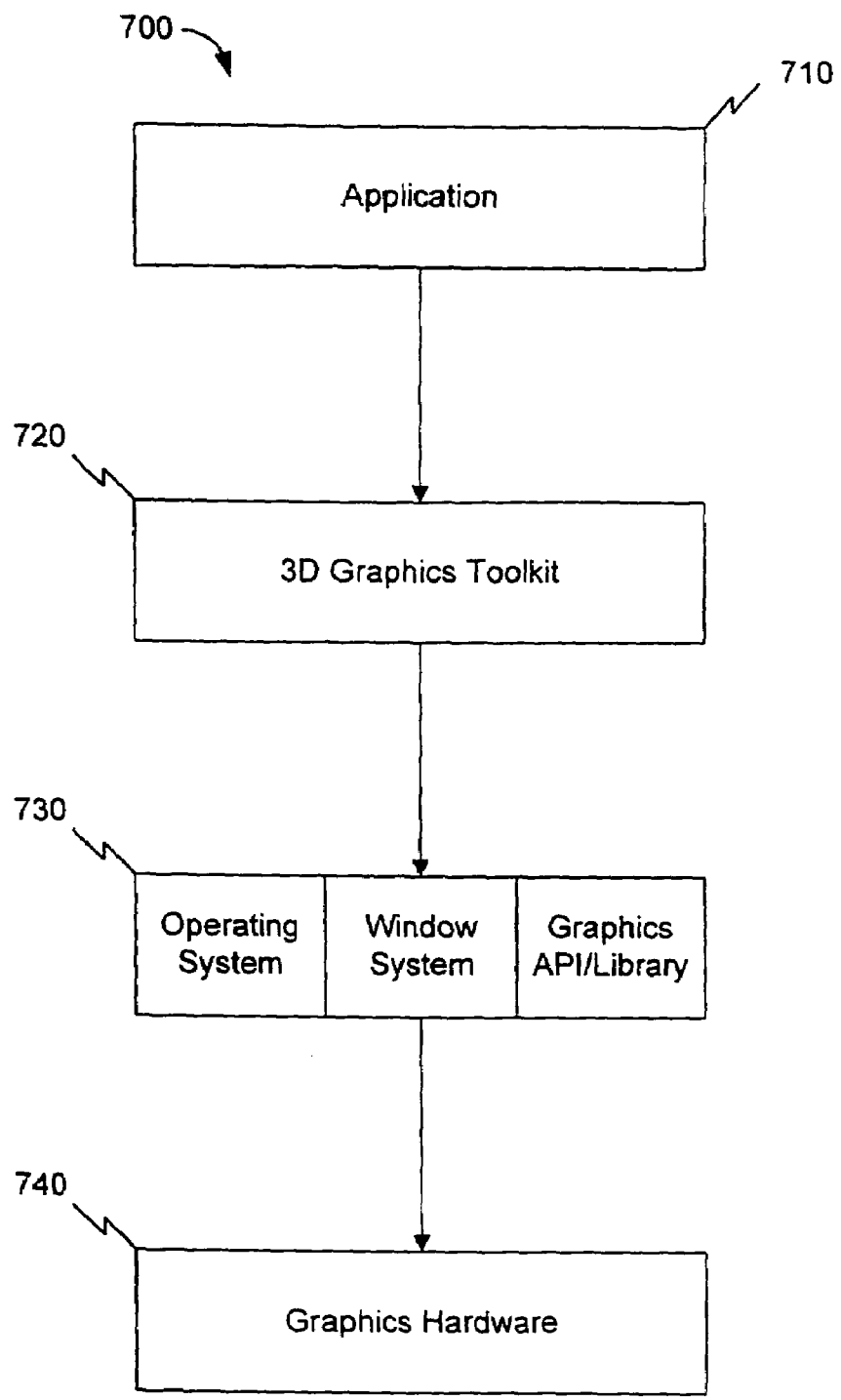
FIG. 7 is a diagram of an example architecture that can support the routine of FIG. 1.

FIG. 7 is a diagram that shows different layers of an architecture 700 related to graphics processing in which routine 100 can be implemented. Architecture 700 includes one or more layers 710-740. As would be apparent to a person skilled in the art given this description, routine 100 can be implemented in any one of layers 710-740, or in any combination of layers 710-740. Layer 710 represents an application program. Layer 720 represents a 3D graphics tool kit. For example, an object-oriented 3D graphics toolkit, such as, OPEN INVENTOR licensed by Silicon Graphics, Inc. See, e.g., Strauss et al., *An Object-Oriented 3D Graphics Tool Kit*, Computer Graphics, 26(2) July 1992, pp. 341-349 (incorporated in its entirety herein by reference).

Layer 730 represents a graphics application programming interface (graphics API) and/or other system support (such as, operating system and windowing system). OpenGL® is an example graphics API. See, e.g., Woo et al., *OpenGL Programming Guide*, Second Ed., version 1.1., Addison-Wesley: MA, 1997 (incorporated in its entirety herein by reference). In one implementation the present invention can be implemented in OpenGL®. OpenGL®, of course, otherwise does not need the present invention to operate.

Layer 740 represents hardware, including graphics hardware. Graphics hardware 740 can be any graphics pipeline or system including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). For example, a computer graphics system can include, but is not limited to, Indigo$^2$, Indy, Onyx, Onyx2, Infinite Reality, Infinite Reality 2, or O$_2$ graphics workstations manufactured by Silicon Graphics, Inc.

Figure 8:
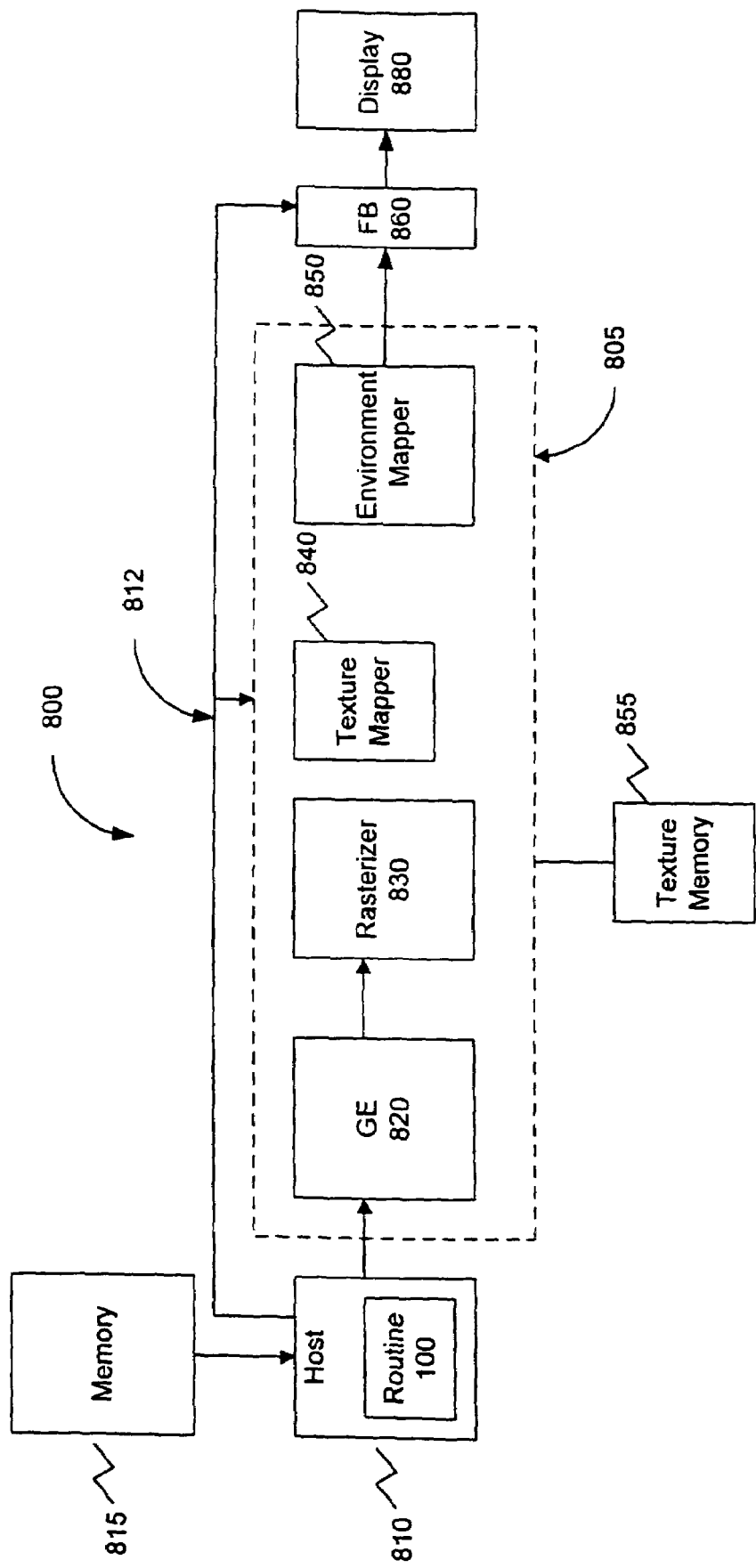
FIG. 8 is a block diagram of an example graphics system that can support the routine of FIG. 1.

FIG. 8 is a diagram of an example computer graphics system 800 implementing routine 100 in further detail. Computer graphics system 800 includes one or more host processors 810 coupled to memory 815 and graphics subsystem 805. Graphics subsystem 805 includes a geometry engine 820, rasterizer 830, texture mapper 840, an environment mapper 850, and texture memory 855. Graphics subsystem 805 can write to a frame buffer 860. Pixel data in frame buffer 860 is ultimately displayed on a screen display 880.

Routine 100 can be implemented as a program running on host processor 810 as shown in FIG. 8. Routine 100 then provides control for graphics system 805 as described above with respect to FIG. 1 and further indicated schematically by control lines 812. Apart from the program executing routine 100 and control lines 812, each of the components in system 800 (including graphics subsystem 805, host processor 810, memory 815, frame buffer 860, and display 880) can be a conventional or commercially available off the shelf (COTS) graphics component. Processing functionality for implementing routine 100 can also be transferred all or in part from host processor 810 to a separate logic unit (not shown) or to the graphics subsystem 805 as would be apparent to a person skilled in the art given this description.

7. Example GUI Computer System

Figure 9:
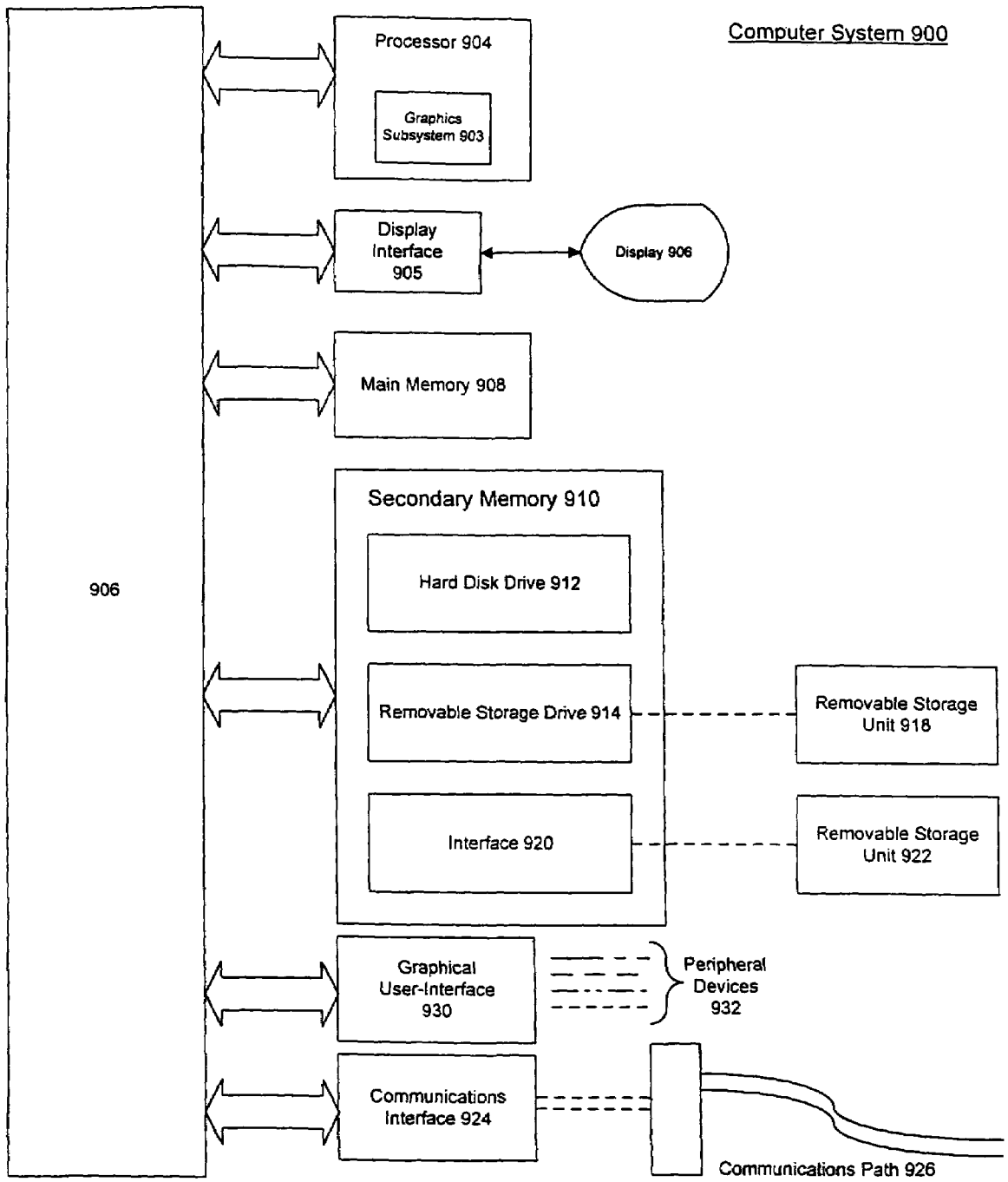
FIG. 9 is an example graphical user-interface computer system that can support the routine of FIG. 1.

FIG. 9 further illustrates an example graphical user-interface (GUI) computer system that can implement routine 100 according to one software embodiment of the present invention. FIG. 9 is a block diagram illustrating an example environment in which the present invention can operate. The environment is a computer system 900 that includes one or more processors, such as processor 904. Computer system 900 can include any type of computer graphics computer, virtual machine, gaming platform, processor (single bus, multiple bus, or bus-less processor(s)), workstation, and network architecture. In one preferred implementation, an OpenGL® machine can be used including, but not limited to, Indigo2™, Indy®, Onyx®, InfiniteReality®, InfiniteReality2™, or O2® graphics workstations manufactured by Silicon Graphics, Inc.

The processor 904 is connected to a communications infrastructure 902 (e.g., a bus, cross-bar switch, or network). Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 900 includes a graphics subsystem 903. Graphics subsystem 903 can be implemented as one or more processor chips. The graphics subsystem 903 can be included as part of processor 904 as shown in FIG. 9 or as a separate graphics engine or processor. Graphics data is output from the graphics subsystem 903 to the bus 902. Display interface 905 forwards graphics data from the bus 902 for display on the display unit 906.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EEPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Graphical user interface module 930 transfers user inputs from peripheral devices 932 to bus 902. These peripheral devices 932 can be a mouse, keyboard, touch screen, microphone, joystick, stylus, light pen, voice recognition unit, or any other type of peripheral unit.

The present invention is preferably implemented using software running (that is, executing) in an environment similar to that described above with respect to FIG. 9. In this document, the term "computer program product" is used to generally refer to removable storage unit 918 or a hard disk installed in hard disk drive 912. These computer program products are means for providing software to computer system 900.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. Alternatively, the computer program product may be downloaded to computer system 900 over communications path 926. The control logic (software), when executed by the processor 904, causes the processor 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Description in these terms is provided for convenience only. It is not intended that the invention be limited to application in this example environment. In fact, after reading the following description, it will become apparent to a person skilled in the relevant art how to implement the invention in alternative environments.

8. Conclusion

Interactive photo-realistic rendering is difficult to achieve because solving the lighting integral is computationally expensive. In one example, the inventors pre-compute this integral into several view-dependent radiance environment maps, each of which would allow realistic rendering of arbitrary geometry from one fixed viewpoint. The inventors further dynamically create new maps for new viewpoints by combining the precomputed maps using an application of IBR techniques in reflection space. The resulting algorithm is readily implementable on most texture mapping capable graphics hardware. The technique allows high rendering quality at interactive rates and from arbitrary viewpoints.

Traditional IBR could not have achieved these results; it is limited to rendering geometry contained in the source images. Traditional rendering, even using radiance environment maps, could also not have achieved these results; it could not provide the viewpoint independence without a fast way to create new intermediate maps. As recognized by the inventors, by applying IBR to an intermediate image representation in traditional rendering, it becomes possible to produce new algorithms that combine the strengths of both.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-readable medium having computer-executable instructions for reflection space image based rendering of an object at an interactive frame rate, the computer-executable instructions performing:

loading a sphere geometry for a global set of source viewing vectors; and loading a global set of source radiance environment maps;

for a frame, computing a destination viewing vector that points along a viewpoint of a current frame;

determining a number of source viewing vectors in said global set of source viewing vectors which are nearest to the destination viewing vector computed in said computing step:

warping each source radiance environment map in a set of source radiance environment maps associated with the number of source viewing vectors nearest the destination viewing vectors to create a destination radiance environment map associated with a destination viewing vector, each source radiance environment map including values representative of pre-integrated total reflected radiance for surface orientations of the object; whereby the object can be rendered with texture environment mapping from the destination radiance environment map without performing integration of a lighting equation; and blending each warped source radiance environment map at a respective weight, and accumulating the blended warped source radiance environment maps in a buffer to create the destination radiance environment map.

2. The computer-readable medium of claim 1, wherein said determining comprises determining at least three source viewing vectors in said global set of source viewing vectors which are nearest to the destination viewing vector computed in said computing step.

3. The computer-readable medium of claim 1, further comprising computing a set of weights for the set of source viewing vectors determined from said global set of source viewing vectors.

4. The computer-readable medium of claim 3, further comprising normalizing the set of weights computed.

5. The computer-readable medium of claim 3, further comprising normalizing the destination radiance environment image based on a normalization of the set of weights computed.

6. The computer-readable medium of claim 5, wherein the computer-executable instructions perform:

loading the normalized destination environment map image into a texture memory; and rendering the object, wherein said rendering includes environment mapping the normalized destination environment map onto the object.

7. The computer-readable medium of claim 1, wherein said warping further comprises: generating meshes with warped sets of texture coordinates, each mesh having a respective set of warped texture coordinates corresponding to a respective warped source radiance environment map.

* * * * *